(12) United States Patent
Igata et al.

(10) Patent No.: US 11,481,819 B2
(45) Date of Patent: Oct. 25, 2022

(54) RENTAL FEE SETTING APPARATUS, METHOD AND SYSTEM

(71) Applicant: TOYOTA JIDOSHA KABUSHIKI KAISHA, Toyota (JP)

(72) Inventors: Hiroshi Igata, Yokohama (JP); Shin Sakurada, Toyota (JP); Kuniaki Jinnai, Nagoya (JP); Motoyoshi Hatta, Anjo (JP); Shota Hirose, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 16/192,339

(22) Filed: Nov. 15, 2018

(65) Prior Publication Data
US 2019/0156379 A1    May 23, 2019

(30) Foreign Application Priority Data
Nov. 17, 2017 (JP) .............................. JP2017-221907

(51) Int. Cl.
*G06Q 30/02*    (2012.01)
*G06Q 30/06*    (2012.01)
(Continued)

(52) U.S. Cl.
CPC ..... *G06Q 30/0283* (2013.01); *G06Q 30/0207* (2013.01); *G06Q 30/0645* (2013.01);
(Continued)

(58) Field of Classification Search
CPC ........... G06Q 30/0283; G06Q 30/0207; G06Q 30/0645; G06Q 50/30; G07C 5/008; G07C 5/085
See application file for complete search history.

(56) References Cited

U.S. PATENT DOCUMENTS 6,694,234 B2 *  2/2004  Lockwood ............. G06Q 10/20
                                                    701/31.5
7,343,306 B1 *  3/2008  Bates ..................... G06Q 40/08
                                                    701/32.4
(Continued)

FOREIGN PATENT DOCUMENTS

CN    106846069 A    6/2017
JP    2002-291110 A   10/2002
(Continued)

OTHER PUBLICATIONS

Anonymous, "Volvo on Call Paid on Time," Credit Management, Oct. 2004, p. 30.*
(Continued)

*Primary Examiner* — Nathan Erb
(74) *Attorney, Agent, or Firm* — Hunton Andrews Kurth LLP (57) ABSTRACT

A management server performs a process including: when an electric vehicle is returned, obtaining a usage history of the vehicle; calculating a ratio of a non-traveling period of time of the vehicle; setting a discount rate based on the ratio of the non-traveling period of time; setting a discount rate based on how many times the vehicle is rapidly accelerated; setting a discount rate based on how many times the vehicle is rapidly decelerated; setting a discount rate based on environmental temperature; setting a discount rate based on a parking environment; setting a discount rate based on an SOC history; and setting a rental fee.

7 Claims, 6 Drawing Sheets

(51) Int. Cl.
*G07C 5/08* (2006.01)
*G06Q 50/30* (2012.01)
*G07C 5/00* (2006.01)

(52) U.S. Cl.
CPC .............. *G06Q 50/30* (2013.01); *G07C 5/008* (2013.01); *G07C 5/085* (2013.01)

(56) References Cited

U.S. PATENT DOCUMENTS

| | | | | |
|---|---|---|---|---|
| 2013/0345903 | A1* | 12/2013 | Nakagawa | G07C 5/008 701/2 |
| 2015/0267380 | A1* | 9/2015 | Kaneko | B60W 10/30 701/22 |
| 2015/0310467 | A1* | 10/2015 | Klampfl | G06Q 30/0206 705/7.35 |
| 2016/0232721 | A1* | 8/2016 | Singh | G07C 5/008 |
| 2016/0288659 | A1* | 10/2016 | Hammoud | H01M 10/633 |
| 2018/0097883 | A1* | 4/2018 | Chow | G06Q 20/4014 |

FOREIGN PATENT DOCUMENTS

| | | |
|---|---|---|
| JP | 2013084199 A | 5/2013 |
| WO | 2016/132423 A1 | 8/2016 |

OTHER PUBLICATIONS

Fleet Owner, "Workhorse electric delivery trucks achieve 30 MPGe," Nashville, Endeavor Business Media, Feb. 15, 2017.*

* cited by examiner

| RATIO OF NON-TRAVELING PERIOD OF TIME | DISCOUNT RATE |
|---|---|
| LARGE VALUE AREA | 5% |
| MEDIUM VALUE AREA | 2% |
| SMALL VALUE AREA | 0% |

| HOW MANY TIMES RAPID ACCELERATION IS DONE | DISCOUNT RATE |
|---|---|
| LARGE VALUE AREA | 0% |
| MEDIUM VALUE AREA | 2% |
| SMALL VALUE AREA | 5% |

FIG.7

| HOW MANY TIMES RAPID DECELERATION IS DONE | DISCOUNT RATE |
|---|---|
| LARGE VALUE AREA | 0% |
| MEDIUM VALUE AREA | 2% |
| SMALL VALUE AREA | 5% |

FIG.8

| ENVIRONMENTAL TEMPERATURE | DISCOUNT RATE |
|---|---|
| HIGHER ENVIRONMENTAL TEMPERATURE | 0% |
| LOWER ENVIRONMENTAL TEMPERATURE | 2% |

FIG.9

| PARKING ENVIRONMENT | DISCOUNT RATE |
|---|---|
| OUTDOOR ENVIRONMENT | 0% |
| INDOOR ENVIRONMENT | 2% |

FIG.10

| SOC | DISCOUNT RATE |
|---|---|
| WITHIN PREDETERMINED RANGE | 2% |
| OUTSIDE PREDETERMINED RANGE | 0% |

RENTAL FEE SETTING APPARATUS, METHOD AND SYSTEM

This nonprovisional application is based on Japanese Patent Application No. 2017-221907 filed on Nov. 17, 2017 with the Japan Patent Office, the entire contents of which are hereby incorporated by reference.

BACKGROUND

Field

The present disclosure relates to setting a rental fee for an electric vehicle.

Description of the Background Art

A conventionally known rental system rents an electric vehicle, a battery mounted therein, and the like to a user and collects a rental fee. For example, Japanese Patent Laying-Open No. 2002-291110 discloses measuring usage data about charging and discharging a battery, and using this data to set a rental fee.

SUMMARY

However, in some cases, how much a battery degrades may also be different in a period of time for which the battery is charged/discharged and a period of time for which it is not. In addition, how much a battery degrades may also vary with the driving histories during the periods of time and its surrounding environment. Accordingly, a rental fee set based only on usage data about charging and discharging a battery as described above may not give sufficient satisfaction to a user.

An object of the present disclosure is to provide a rental fee setting apparatus, method and system that sets a rental fee for an electric vehicle to be rented to a user so that the user is sufficiently satisfied with the set rental fee.

According to one aspect of the present disclosure, a rental fee setting apparatus is a rental fee setting apparatus configured to set a rental fee for an electric vehicle comprising a power storage device mounted therein. The present rental fee setting apparatus comprises: a storage device configured to store a utilization history of the electric vehicle while rented; and a setting device configured to set a rental fee depending on a ratio of a non-traveling period of time of the electric vehicle to a utilizing period of time of the electric vehicle. The non-traveling period of time includes a period of time of the utilizing period of time, for which the electric vehicle is stopped and the power storage device is neither charged nor discharged.

In this way, a rental fee depending on an amount by which the electric vehicle is not utilized will be set, and a rental fee sufficiently satisfying a user can thus be set.

In an embodiment, the setting device is configured to set a lower rental fee when the non-traveling period of time has a larger ratio than when the non-traveling period of time has a smaller ratio.

In this way, a rental fee of an amount smaller by an amount by which the electric vehicle is not utilized will be set, and a rental fee sufficiently satisfying a user can thus be set.

In an embodiment, the setting device is configured to obtain a history of a traveling power of the electric vehicle for the utilizing period of time, and based on the obtained history of the traveling power when the electric vehicle is rapidly accelerated a smaller number of times, the setting device is configured to set a lower rental fee than when the electric vehicle is rapidly accelerated a larger number of times.

In this way, for a period of time for which the electric vehicle is utilized when the vehicle is driven with the power storage device gradually degraded, a rental fee of a smaller amount will be set, and a rental fee giving sufficient satisfaction to a user can thus be set.

In an embodiment, the setting device is configured to obtain a history of a traveling power of the electric vehicle for the utilizing period of time, and based on the obtained history of the traveling power when the electric vehicle is rapidly decelerated a smaller number of times, the setting device is configured to set a lower rental fee than when the electric vehicle is rapidly decelerated a larger number of times.

In this way, for a period of time for which the electric vehicle is utilized when the vehicle is driven with the power storage device gradually degraded, a rental fee of a smaller amount will be set, and a rental fee giving sufficient satisfaction to a user can thus be set.

In an embodiment, the setting device is configured to obtain a history of an external temperature from the electric vehicle for the utilizing period of time, and based on the obtained history of the external temperature when an environmental temperature during the non-traveling period of time is a lower environmental temperature, the setting device is configured to set a lower rental fee than when the environmental temperature is a higher environmental temperature.

In this way, for a non-traveling period of time when the vehicle is stopped with the power storage device gradually degraded, a rental fee of a smaller amount is set, and a rental fee giving sufficient satisfaction to a user can thus be set.

In an embodiment, the setting device is configured to obtain a history of positional information of the electric vehicle for the utilizing period of time, and based on the obtained history of the positional information when the electric vehicle during the non-traveling period of time is parked indoor, the setting device is configured to set a lower rental fee than when the electric vehicle during the non-traveling period of time is parked outdoor.

In this way, for a non-traveling period of time when the vehicle is stopped with the power storage device gradually degraded, a rental fee of a smaller amount is set, and a rental fee giving sufficient satisfaction to a user can thus be set.

In an embodiment, the setting device is configured to obtain a history of a state of charge of the power storage device from the electric vehicle for the utilizing period of time, and based on the obtained history of the state of charge when a state of charge for the non-traveling period of time falls within a predetermined range, the setting device is configured to set a lower rental fee than when the state of charge for the non-traveling period of time does not fall within the predetermined range.

In this way, for a non-traveling period of time when the vehicle is stopped with the power storage device gradually degraded, a rental fee of a smaller amount is set, and a rental fee giving sufficient satisfaction to a user can thus be set.

A method according to another aspect of the present disclosure is a method for setting a rental fee for an electric vehicle comprising a power storage device mounted therein. The present method comprises: storing a utilization history of the electric vehicle while rented; and setting a rental fee depending on a ratio of a non-traveling period of time of the electric vehicle to a utilizing period of time of the electric vehicle. The non-traveling period of time includes a period of time of the utilizing period of time, for which the electric vehicle is stopped and the power storage device is neither charged nor discharged.

According to still another aspect of the present disclosure, a rental fee setting system comprises: an electric vehicle including a power storage device mounted therein; and a server configured to set a rental fee for the electric vehicle. The server is configured to: store a utilization history of the electric vehicle while rented; and set a rental fee depending on a ratio of a non-traveling period of time of the electric vehicle to a utilizing period of time of the electric vehicle. The non-traveling period of time includes a period of time of the utilizing period of time, for which the electric vehicle is stopped and the power storage device is neither charged nor discharged.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

<Configuration of Rental Fee Setting System>

Figure 1:
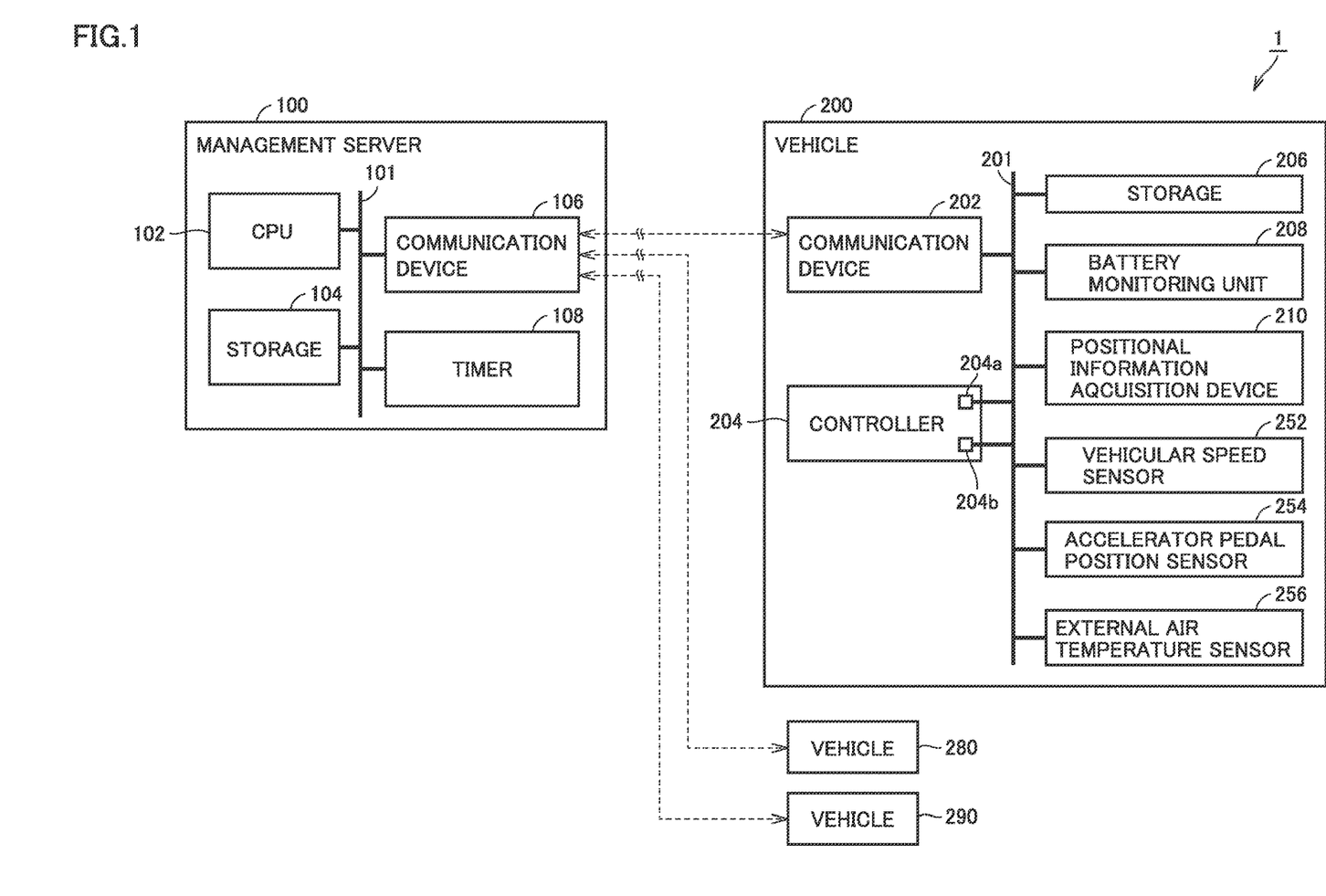
FIG. 1 is an overall configuration diagram of a rental fee setting system according to the present embodiment.

FIG. 1 is an overall configuration diagram of a rental fee setting system 1 according to the present embodiment. As shown in FIG. 1, rental fee setting system 1 according to the present embodiment includes a management server 100, and vehicles 200, 280 and 290 which are electric vehicles.

Management server 100 includes a CPU (Central Processing Unit) 102, a storage 104, a communication device 106, and a timer 108. Each component is communicatively connected by a communication bus 101.

CPU 102 is configured to execute prescribed computation processing based for example on information stored in storage 104, information received from vehicle 200 via communication device 106, and/or the like.

Storage 104 includes, for example, a memory such as a ROM (Read Only Memory) and a RAM (Random Access Memory), and a large-capacity storage device such as a hard disk or a solid state drive. Storage 104 stores, for example, information associating the plurality of vehicles 200, 280, 290 with the user of each vehicle (i.e., a user list).

Communication device 106 is configured to communicate with communication device 202 of vehicle 200. For example, communication device 106 and communication device 202 communicate information with each other through wireless communication. Communication device 106 and communication device 202 may communicate via a relay point (a wireless base station), a prescribed communication network (for example, the Internet), or the like, or may not communicate via a relay point, a prescribed communication network or the like. Further, communication device 106 is configured to similarly communicate with both vehicle 280 and vehicle 290.

The wireless communications may be done in a wireless communication system capable of transmitting and receiving signals via a relay point utilizing a wireless LAN (Local Area Network) represented by IEEE 802.11, a wireless communication standard for a mobile phone such as 2G, 3G, 4G, 5G, etc., and the like, or may be done in a wireless communication system capable of transmitting and receiving signals directly between communication device 106 and communication device 202 and for example utilizing a wireless communication standard such as Bluetooth (Registered trademark) or the like.

Timer 108 counts the current date and time. For example, CPU 102 stores in storage 104 a result of counting time by timer 108. When reading the current date and time from storage 104, CPU 102 may correct the current date and time by an externally received digital signal (standard radio wave) including date information and time information.

Vehicle 200 includes communication device 202, a controller 204, a storage 206, a battery monitoring unit 208, a positional information acquisition device 210, a vehicular speed sensor 252, an accelerator pedal position sensor 254, and an external air temperature sensor 256. Each component is communicatively connected by a communication bus 201.

For example, communication device 202 is configured to communicate with communication device 106 of management server 100. Communication device 106 and communication device 202 wirelessly communicate as has been described above, and accordingly, how they do so will not be described redundantly.

Controller 204 includes, for example, a CPU 204a, a memory 204b (ROM and RAM), an input/output port for inputting and outputting various signals (not shown) and so forth. Controller 204 is configured to execute prescribed computation processing based on the information stored in memory 204b and storage 206, information received from management server 100 via communication device 202, and the like.

Storage 206 is a storage device that can store data of a larger size than memory 204b, and is, for example, a storage device composed of a nonvolatile memory, a hard disk, a solid state drive, or the like. Storage 206 stores, for example, an external air temperature history, vehicle 200's driving history (for example, positional information history (i.e., a traveling route), a vehicular speed history, and an accelerator pedal position history), an SOC (state of charge) history of battery 214 (see FIG. 2), and battery 214's voltage, current, and temperature histories, and the like. Battery monitoring unit 208 detects a state of a battery 214 mounted in vehicle 200. Battery monitoring unit 208 detects, for example, battery 214's voltage, current and temperature. Battery monitoring unit 208 calculates an estimated value of an SOC of battery 214 by using for example the detected voltage, current and temperature of battery 214. The SOC may be estimated using a well-known technique, and it will not be described specifically. Note that the SOC may be estimated by controller 204 rather than battery monitoring unit 208.

Positional information acquisition device 210 is configured to obtain the current position of vehicle 200. For example, positional information acquisition device 210 may obtain the current position of vehicle 200 by using GPS (Global Positioning System), or may obtain the current position of vehicle 200 by using positional information of a wireless communication device located outside vehicle 200 and capable of communicating with communication device 106. Positional information acquisition device 210 transmits to controller 204 a signal indicating the current position of vehicle 200 as obtained.

Vehicular speed sensor 252 senses the speed of vehicle 200. Vehicular speed sensor 252 transmits a signal indicating the sensed speed of vehicle 200 to controller 204.

Accelerator pedal position sensor 254 senses an amount of pressing an accelerator pedal (not shown) (hereinafter referred to as an accelerator pedal position). Accelerator pedal position sensor 254 transmits a signal indicating the sensed accelerator pedal position to controller 204.

External air temperature sensor 256 senses the temperature around vehicle 200 (hereinafter referred to as external air temperature). External air temperature sensor 256 transmits a signal indicating the sensed external air temperature to controller 204. Controller 204 causes storage 206 to store therein a variety of types of information based on the signals received from battery monitoring unit 208, positional information acquisition device 210, vehicular speed sensor 252, accelerator pedal position sensor 254, and external air temperature sensor 256.

Figure 2:
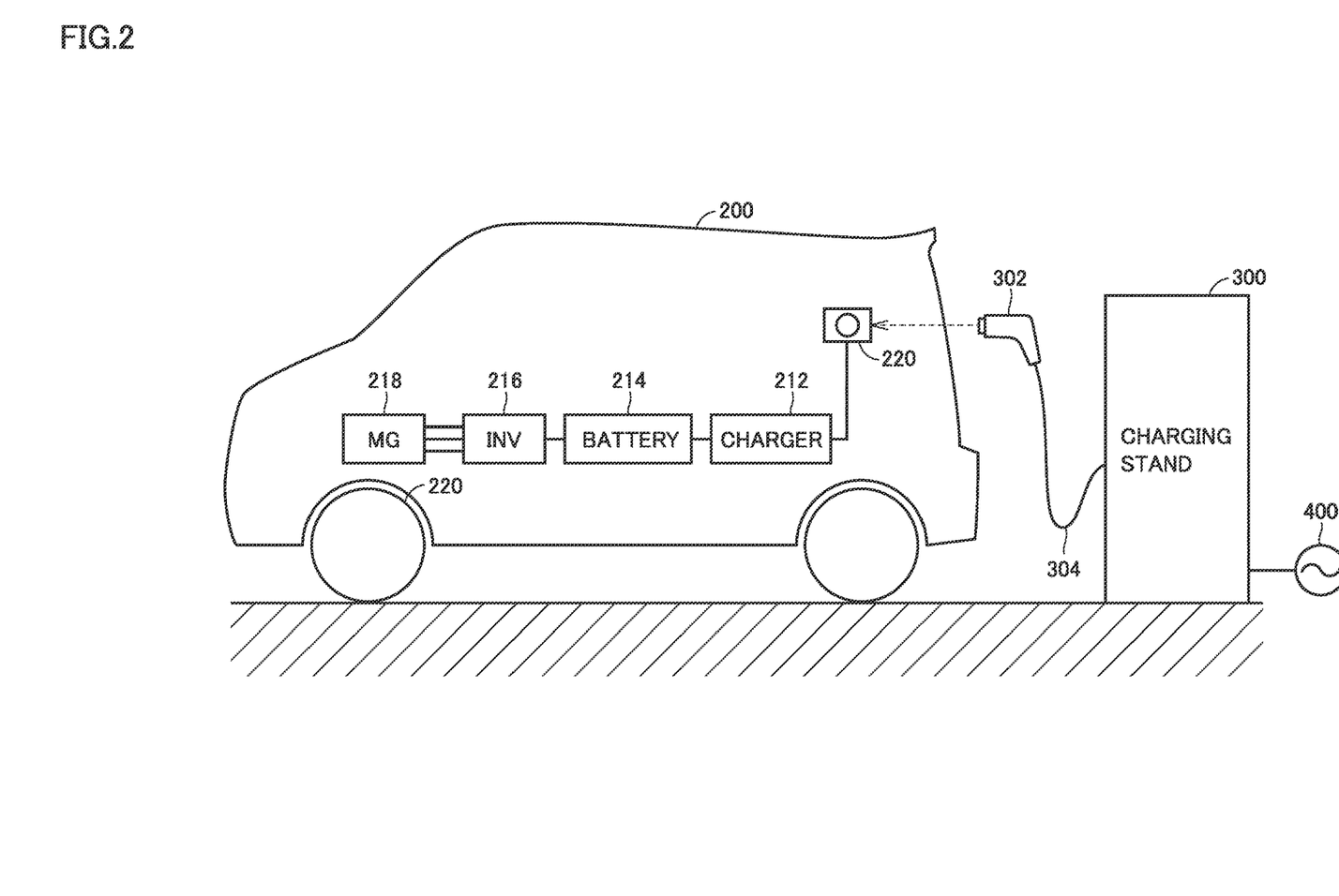
FIG. 2 is a diagram showing an example of a configuration of the electric vehicle.

Vehicle 200 is an electric vehicle using an electric motor as a driving power source. FIG. 2 is a diagram showing an example of a configuration of the electric vehicle.

As shown in FIG. 2, vehicle 200 further includes a charger 212, battery 214, an inverter 216, a motor generator 218, and an inlet 220.

When a charging stand 300 has a charging connector 302 attached to inlet 220, charger 212 charges battery 214 with power supplied from an external power supply 400.

Battery 214 is configured using, for example, a secondary battery such as a nickel metal hydride battery or a lithium ion battery. Battery 214 may be any power storage device capable of storing power, and for example, a large-capacity capacitor may be used instead of battery 214.

Inverter 216 is a power conversion device which converts power between AC power and DC power. Inverter 216 may for example convert DC power of battery 214 into AC power and supplies it to motor generator 218. Further, inverter 216 may for example receive AC power (regenerative power) from motor generator 218, convert it into DC power, and supply it to battery 214 to electrically charge battery 214 therewith.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided to vehicle 200 at an exterior portion of vehicle 200 together with a cover (not shown) such as a lid. Inlet 220 has a shape allowing charging connector 302 to be attached thereto. Inlet 220 and charging connector 302 both have contacts, respectively, incorporated therein, and when charging connector 302 is attached to inlet 220, the contacts come into contact with each other, and inlet 220 and charging connector 302 are thus electrically connected together.

Charging stand 300 is installed outside vehicle 200 and connected to charging connector 302 via a charging cable 304. Charging stand 300 is electrically connected to power supply 400, and when charging connector 302 is attached to inlet 220, the power of power supply 400 is supplied via charging stand 300, charging cable 304, and charging connector 302 to vehicle 200.

Vehicles 280 and 290 are similar in configuration to vehicle 200. Accordingly, they will not be described redundantly.

<Manner of Utilization of Electric Vehicle>

In the present embodiment, as a manner of utilization an electric vehicle, for example, a user can select for example any of: leasing an electric vehicle until a prescribed term of a contract (of one year or plural years) expires (i.e., leasing); setting a fee per unit period of time and collecting when a vehicle is returned a rental fee depending on a period of time for which the vehicle is utilized (i.e., renting); and allowing a plurality of people to share one or more electric vehicles until a prescribed term of a contract expires (i.e., sharing).

Of these manners of utilization, for example, when an electric vehicle is rented, a rental fee corresponding to how vehicle 200 has been utilized may be set when vehicle 200 is returned. Alternatively, for example, when an electric vehicle is leased, a rental fee may be set for each prescribed period or time (for example of one month). Furthermore, for example, when an electric vehicle is shared, an amount obtained by adding a fee for each prescribed period of time and a fee depending on utilizing the vehicle may be set as a rental fee.

While, of a fee thus set, a fee corresponding to utilizing an electric vehicle will normally be calculated by multiplying, when the electric vehicle is returned, a fee per unit time by a period of time for which the electric vehicle is utilized, and how much a battery mounted in the electric vehicle degrades may vary depending on how a user uses the electric vehicle. Accordingly, it is desirable to also reflect in a rental fee how the user utilizes the electric vehicle. Thus setting a fee may include setting a rental fee based on information about charging and discharging a battery for example. However, in some cases, how much a battery degrades may also be different in a period of time for which the battery is charged/discharged and a period of time for which it is not. In addition, how much the battery degrades also varies depending on the driving histories during those periods of time and its surrounding environment, and a rental fee set based only on information about charging and discharging the battery may not sufficiently satisfy a user.

Accordingly, in the present embodiment, management server 100 sets a rental fee according to a ratio of an electric vehicle's non-traveling period of time to a period of time for which the electric vehicle is utilized. More specifically, when the electric vehicle has a non-traveling period of time having a larger ratio to a period of time for which the electric vehicle is utilized, management server 100 sets a rental fee of a smaller amount than when the electric vehicle has a non-traveling period of time having a smaller ratio to a period of time for which the electric vehicle is utilized. The non-traveling period of time includes that period of time of the period of time for which the electric vehicle is utilized, for which the electric vehicle is stopped and the battery is neither charged nor discharged. In the present embodiment, management server 100 corresponds to a "rental fee setting apparatus."

In this way, a rental fee of an amount smaller by an amount by which the electric vehicle is not utilized will be set, and a rental fee sufficiently satisfying a user can thus be set.

<Setting a Rental Fee>

In the following description, for example, a case in which an electric vehicle is utilized by rental as a manner of utilizing the electric vehicle will be described as an example. For example, management server 100 determines a date and time when vehicle 200 is rented (i.e., a renting date and time) and stores to storage 104 information associating the renting date and time with vehicle 200 rented and the user of the vehicle. Management server 100 also determines a date and time when vehicle 200 is returned (i.e., a return date and time), and uses the renting date and time and the return date and time to calculate a period of time for which the electric vehicle is utilized. Management server 100 sets a rental fee by multiplying the calculated period of time by a unit price per predetermined period of time (for example, a fee per hour).

Management server 100 obtains a utilization history from vehicle 200 rented and uses the utilization history to set a discount rate. Management server 100 multiplies the rental fee by the set discount rate to calculate a discounted amount, and subtracts the discounted amount from the rental fee to set a final rental fee charged to the user.

<Rental Fee Setting Process>

Figure 3:
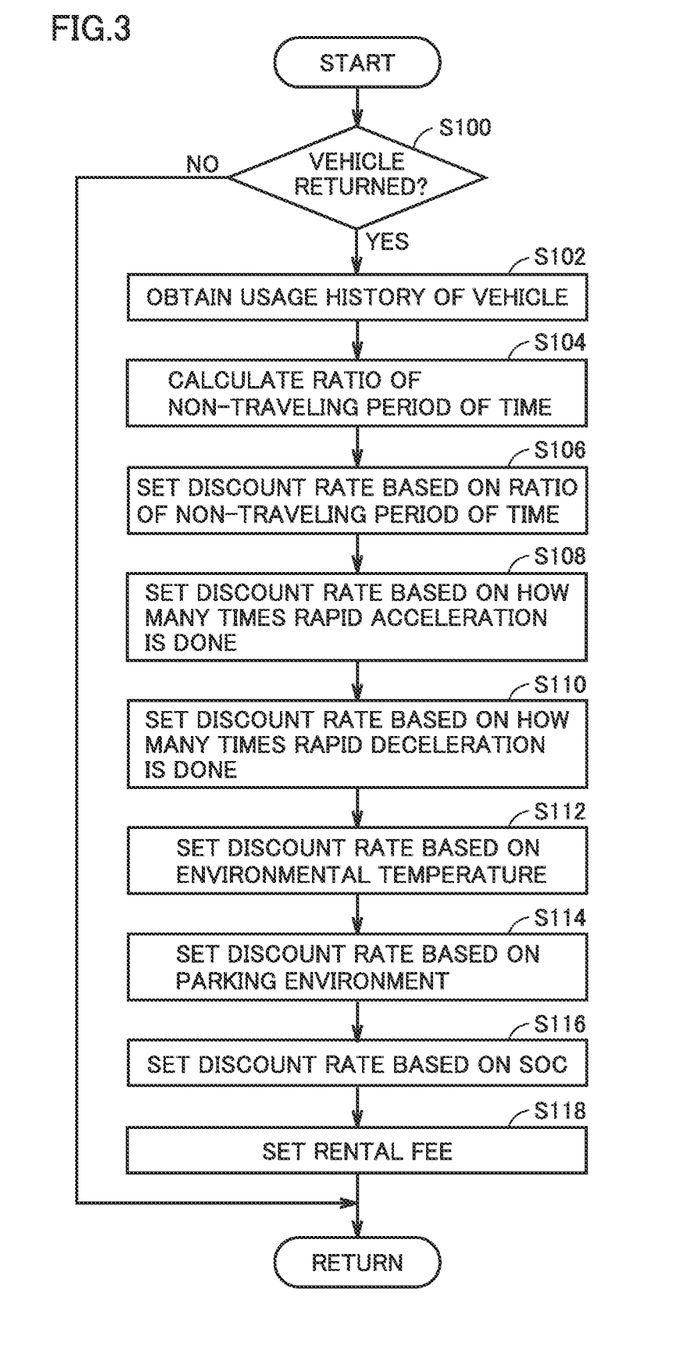
FIG. 3 is a flowchart of a rental fee setting process.

Hereinafter, a rental fee setting process will be described in detail with reference to FIG. 3. FIG. 3 is a flowchart of the rental fee setting process. In the present embodiment, the rental fee setting process will be described as being executed by management server 100 (more specifically, CPU 102 of management server 100) for the sake of illustration. While each step shown in the flowchart shown in FIG. 3 is implemented by software processing done by management server 100, a part thereof may be implemented by hardware (or electric circuitry) fabricated in management server 100.

In step ("S") 100, management server 100 determines whether a rented electric vehicle has been returned.

For example, management server 100 may determine that the rented electric vehicle is returned when management server 100 receives from vehicle 200 user information which identifies the user or the vehicle, and return information indicating that a returning operation has been done to vehicle 200. The returning operation includes, for example, an operation of returning vehicle 200 at a parking lot (or a station) to which the vehicle is to be returned, and parking and locking the vehicle there. Management server 100 determines that the returning operation has been done when positional information acquisition device 210 obtains information indicating that vehicle 200 is located in the parking lot (or station) to which the vehicle is to be returned and a sensor senses that vehicle 200 is locked and parked there. Alternatively, management server 100 may determine that the rented electric vehicle has been returned when the user information and the return information have been received from a terminal device operated by a manager of the parking lot to which the vehicle is returned.

It is to be noted that the above-described methods of determining whether an electric vehicle has been returned are merely examples, and are not exclusive. When it is determined that the rented electric vehicle has been returned (YES in S100), the process proceeds to S102.

In S102, management server 100 obtains a usage history from vehicle 200. The usage history includes information about the vehicle's non-traveling period of time, how many times the vehicle is rapidly accelerated, how many times the vehicle is rapidly decelerated, a history of external air temperature during the non-traveling period of time, a history of positional information (or a traveling route), and a history of SOC during the non-traveling period of time. Management server 100 transmits a request to the returned vehicle 200 to transmit the usage history. In response to the request from management server 100 to transmit the usage history, controller 204 of vehicle 200 transmits to management server 100 the usage history stored in storage 206. Note that controller 204 obtains a usage history while the vehicle is utilized, and controller 204 stores it to storage 206. Variety of types of information and histories included in the usage history will be described later. Further, when controller 204 transmits the usage history to management server 100 in response to the request to do so, controller 204 may erase the usage history stored in storage 206 or may erase the usage history when the vehicle is rented next time.

In S104, management server 100 calculates a ratio of the non-traveling period of time to the period of time for which the electric vehicle is utilized. For example, as described above, management server 100 calculates the period of time for which the electric vehicle is utilized from a return time and a renting time. For example, management server 100 calculates the ratio of the non-traveling period of time by dividing the non-traveling period of time by the period of time for which the electric vehicle is utilized.

Controller 204 of vehicle 200 measures the non-traveling period of time during the period of time for which the electric vehicle is utilized. For example, controller 204 measures as the non-traveling period of time a period of time for which vehicular speed sensor 252 senses a vehicular speed equal to or less than a threshold value and being substantially zero and battery monitoring unit 208 senses that the battery is neither charged nor discharged, and controller 204 causes storage 206 to store the measured non-traveling period of time. Controller 204 determines that battery 214 is neither charged nor discharged for example when battery 214 is charged with a current having a magnitude equal to or less than a threshold value and battery 214 discharges a current having a magnitude equal to or less than a threshold value. When controller 204 receives a request for transmission, controller 204 transmits the measured non-traveling period of time as information about the vehicle's non-traveling period of time to management server 100.

In S106, management server 100 sets a discount rate A(1) based on the calculated ratio of the non-traveling period of time. For example, the discount rate A(1) is set to allow a rental fee to be a different fee when a ratio of a non-traveling period of time is alone different, for example. For example, the discount rate A(1) is set to allow a rental fee to be a smaller amount for a non-traveling period of time having a larger ratio than a non-traveling period of time having a smaller ratio.

Figure 4:
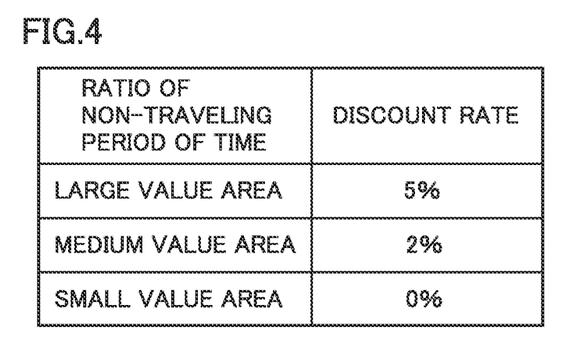
FIG. 4 is a diagram for explaining an example of a discount rate set depending on a ratio of a non-travelling period of time.

FIG. 4 is a diagram for explaining an example of a discount rate set depending on a ratio of a non-travelling period of time. As shown in FIG. 4, for example, the ratio of the non-traveling period of time is classified by a plurality of threshold values (e.g., a first threshold value for division into a large value area and a medium value area and a second threshold value for division into the medium value area and a small value area) into one of the large, medium and small value areas, and a map in which a discount rate is set for each classification is previously stored in storage 104. Management server 100 refers to the map to set a different discount rate A(1) depending on to which classification the ratio of the non-traveling period of time calculated corresponds.

For example, for a non-traveling period of time having a ratio in the large value area, management server 100 sets a discount rate A(1) of 5%. Furthermore, for a non-traveling period of time having a ratio in the medium value area, management server 100 sets a discount rate A(1) of 2%. Furthermore, for a non-traveling period of time having a ratio in the small value area, management server 100 sets a discount rate A(1) of 0%. The numerical values of the discount rates described above and below are mere examples and are not a limitation. Furthermore, while the discount rates described above and below are described by referring as one example to a case of setting them in three stages, they may be set in a plurality of stages such as two or four or more stages.

Returning to FIG. 3, in S108, management server 100 sets a discount rate A(2) based on how many times the electric vehicle is rapidly accelerated during the period of time for which it is utilized. The discount rate A(2) is set to allow a rental fee to be a different fee when how many times the electric vehicle is rapidly accelerated is alone different. For example, the discount rate A(2) is set to allow a rental fee to be a smaller amount when the vehicle is rapidly accelerated a smaller number of times than when the vehicle is rapidly accelerated a larger number of times.

Controller 204 of vehicle 200 counts how many times the vehicle is rapidly accelerated and decelerated during the period of time for which the vehicle is utilized. For example, controller 204 counts how many times the vehicle is rapidly accelerated by counting how many times a vehicular requested power based on a requested driving force based on an accelerator pedal position and a vehicular speed exceeds an acceleration power line as the accelerator pedal is depressed for example. Further, controller 204 counts how many times the vehicle is rapidly decelerated by counting how many times a vehicular requested power exceeds a deceleration power line as the accelerator pedal is released for example.

Figure 5:
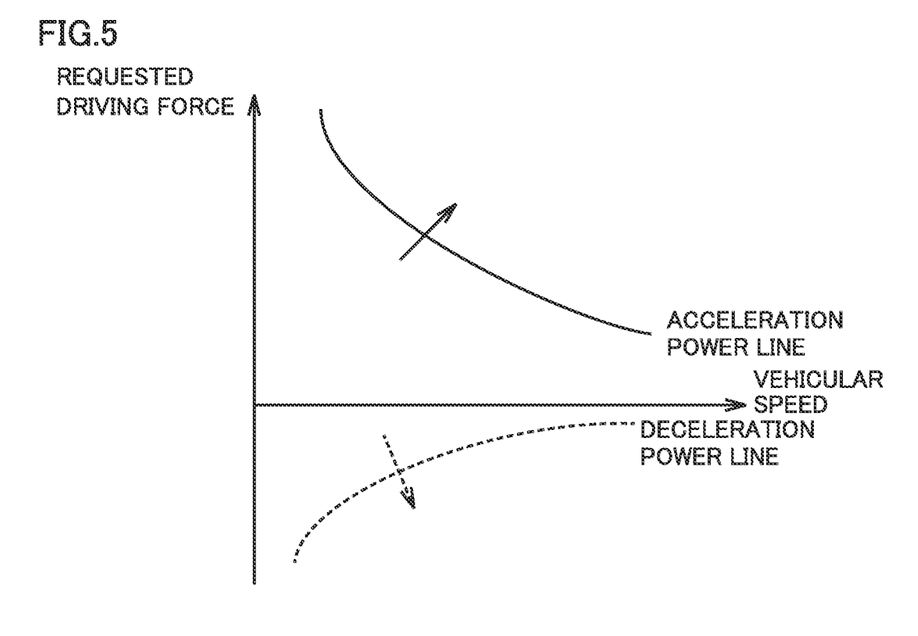
FIG. 5 is a diagram for illustrating an acceleration power line and a deceleration power line.

FIG. 5 is a diagram for illustrating an acceleration power line and a deceleration power line. In FIG. 5, the horizontal axis represents vehicular speed and the vertical axis represents requested driving force. When the accelerator pedal is depressed, a requested driving force will have a positive value, whereas when the accelerator pedal is released, a requested driving force will have a negative value. As indicated in FIG. 5 by a solid line, the acceleration power line is set in a positive region where requested driving force is larger than zero. As indicated in FIG. 5 by a broken line, the deceleration power line is set in a negative region where required driving force is smaller than zero. The acceleration power line and the deceleration power line are both, for example, power lines such that when repeatedly exceeding them may facilitate degrading battery 214, and the power lines are adapted through an experiment or the like.

When vehicular requested power crosses the acceleration power line indicated in FIG. 5 by the solid line, as indicated in FIG. 5 by a solid arrow, controller 204 increments by one how many times the vehicle is rapidly accelerated, and controller 204 causes storage 206 to store it.

Similarly when vehicular requested power crosses the deceleration power line indicated in FIG. 5 by the broken line, as indicated in FIG. 5 by a broken arrow, controller 204 increments by one how many times the vehicle is rapidly decelerated, and controller 204 causes storage 206 to store it. When controller 204 receives a request for transmission, controller 204 transmits to management server 100 how many times the vehicle is rapidly accelerated and how many times the vehicle is rapidly decelerated.

Figure 6:
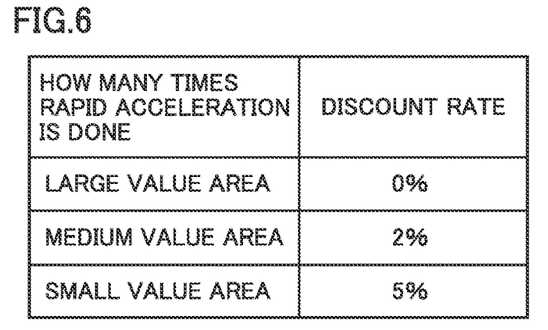
FIG. 6 is a diagram for explaining an example of a discount rate set depending on how many times rapid acceleration is done.

FIG. 6 is a diagram for explaining an example of a discount rate set depending on how many times the vehicle is rapidly accelerated. As shown in FIG. 6, for example, how many times the vehicle is rapidly accelerated is classified by a plurality of threshold values (e.g., a first threshold value for division into a large value area and a medium value area and a second threshold value for division into the medium value area and a small value area) into one of the large, medium and small value areas, and a map in which a discount rate is set for each classification is previously stored in storage 104. Management server 100 refers to the map to set a different discount rate A(2) depending on to which classification how many times the vehicle is rapidly accelerated corresponds.

For example, when how many times the vehicle is rapidly accelerated falls within the large value area, management server 100 sets a discount rate A(2) of 0%. When how many times the vehicle is rapidly accelerated falls within the medium value area, management server 100 sets a discount rate A(2) of 2%. When how many times the vehicle is rapidly accelerated falls within the small value area, management server 100 sets a discount rate A(2) of 5%.

Returning to FIG. 3, in S110, management server 100 sets a discount rate A(3) based on how many times the electric vehicle is rapidly decelerated during the period of time for which it is utilized. The discount rate A(3) is set to allow a rental fee to be a different fee when how many times the electric vehicle is rapidly decelerated is alone different. For example, the discount rate A(3) is set to allow a rental fee to be a smaller amount when the vehicle is rapidly decelerated a smaller number of times than when the vehicle is rapidly decelerated a larger number of times.

Figure 7:
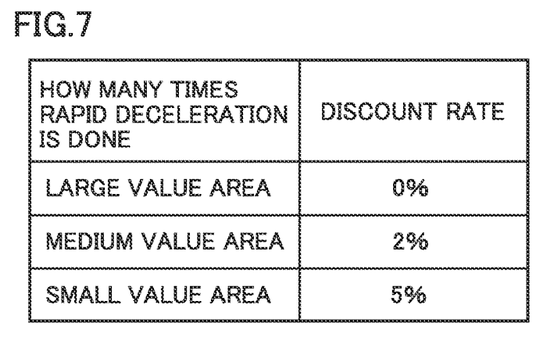
FIG. 7 is a diagram for explaining an example of a discount rate set depending on how many times rapid deceleration is done.

FIG. 7 is a diagram for explaining an example of a discount rate set depending on how many times the electric vehicle is rapidly decelerated. As shown in FIG. 7, for example, how many times the vehicle is rapidly decelerated is classified by a plurality of threshold values (e.g., a first threshold value for division into a large value area and a medium value area and a second threshold value for division into the medium value area and a small value area) into one of the large, medium and small value areas, and a map in which a discount rate is set for each classification is previously stored in storage 104. Management server 100 refers to the map to set a different discount rate A(3) depending on to which classification how many times the vehicle is rapidly decelerated corresponds.

For example, when how many times the vehicle is rapidly decelerated falls within the large value area, management server 100 sets a discount rate A(3) of 0%. When how many times the vehicle is rapidly decelerated falls within the medium value area, management server 100 sets a discount rate A(3) of 2%. When how many times the vehicle is rapidly decelerated falls within the small value area, management server 100 sets a discount rate A(3) of 5%.

Returning to FIG. 3, in S112, management server 100 sets a discount rate A(4) based on environmental temperature during the non-traveling period of time. The discount rate A(4) is set to allow a rental fee to be a different fee when environmental temperature during a non-traveling period of time is alone different. For example, the discount rate A(4) is set to allow a rental fee to be a smaller amount for a lower environmental temperature during a non-traveling period of time than a higher environmental temperature during a non-traveling period of time.

Figure 8:
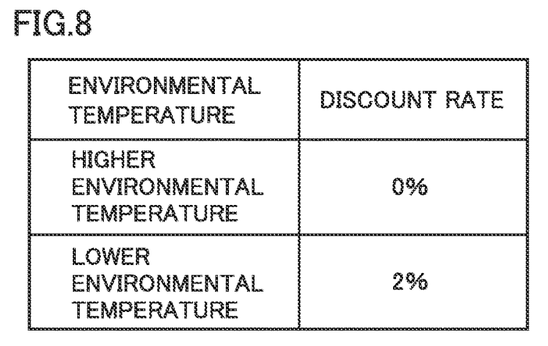
FIG. 8 is a diagram for explaining an example of a discount rate set depending on environmental temperature.

FIG. 8 is a diagram for explaining an example of a discount rate set depending on environmental temperature. As shown in FIG. 8, for example, external air temperature is classified by a threshold value into higher environmental temperature and lower environmental temperature and a map in which a discount rate is set for each classification is previously stored in storage 104. Management server 100 refers to the map to set a different discount rate A(4) depending on to which classification the environmental temperature of interest corresponds.

More specifically, management server 100 calculates an average value from a history as obtained of external air temperature during a non-traveling period of time, and when the calculated average value is higher than the threshold value, management server 100 determines that it corresponds to higher environmental temperature, whereas when the calculated average value is lower than the threshold value, management server 100 determines that it corresponds to lower environmental temperature.

For example, for higher environmental temperature during a non-traveling period of time, management server 100 sets a discount rate A(4) of 0%. For lower environmental temperature during a non-traveling period of time, management server 100 sets a discount rate A(4) of 2%.

Returning to FIG. 3, in S114, management server 100 sets a discount rate A(5) based on a parking environment during the non-traveling period of time. The discount rate A(5) is set to allow a rental fee to be a different fee when a parking environment during the non-traveling period of time is alone different. For example, the discount rate A(5) is set to allow a rental fee to be a smaller amount when a parking environment during a non-traveling period of time is an indoor environment than when it is an outdoor environment.

Figure 9:
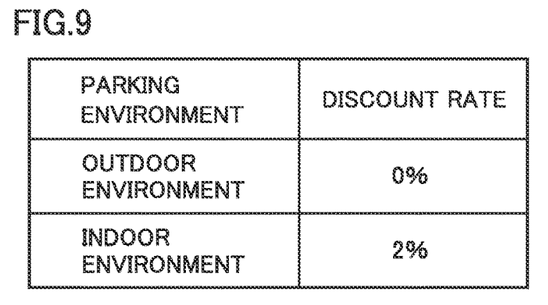
FIG. 9 is a diagram for explaining an example of a discount rate set depending on a parking environment.

FIG. 9 is a diagram for explaining an example of a discount rate set depending on a parking environment. As shown in FIG. 9, for example, a map in which a discount rate is set for each classification of an indoor environment and an outdoor environment as a parking environment is previously stored in storage 104. Management server 100 refers to the map to set a different discount rate A(5) depending on to which classification the parking environment corresponds.

Management server 100 determines whether vehicle 200 is parked indoor or outdoor from the positional information of the vehicle during the non-traveling period of time. For example, during a non-traveling period of time when vehicle 200 is located in a pre-registered indoor parking lot or an underground parking lot management server 100 determines that during the non-traveling period of time the vehicle is parked indoor. For example during a non-traveling period of time when vehicle 200 is not located in an indoor parking lot or an underground parking lot management server 100 determines that during the non-traveling period of time the vehicle is parked outdoor. Note that, for example, during a non-traveling period of time when the vehicle is parked indoor for a period of time and outdoor for another period of time, management server 100 may determine that during the non-traveling period of time the vehicle is parked indoor when a ratio of the period of time for which the vehicle is parked indoor to the non-traveling period of time is equal to or greater than a threshold value.

For example, during a non-traveling period of time when the vehicle is parked outdoor, management server 100 sets a discount rate A(5) of 0%. During a non-traveling period of time when the vehicle is parked indoor, management server 100 sets a discount rate A(5) of 2%.

Returning to FIG. 3, in S116, management server 100 sets a discount rate A(6) based on a history of SOC during the non-traveling period of time. The discount rate A(6) is set to allow a rental fee to be a different fee when the history of SOC during the non-traveling period of time is alone different. For example, the discount rate A(6) is set to allow a rental fee to be a smaller amount when an SOC during a non-traveling period of time falls within a predetermined range than when it does not.

Figure 10:
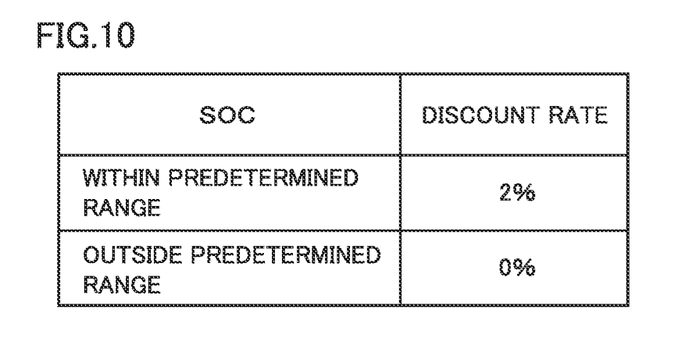
FIG. 10 is a diagram for explaining an example of a discount rate set depending on SOC.

FIG. 10 is a diagram for explaining an example of a discount rate set depending on the SOC. As shown in FIG. 10, for example, the SOC is classified by a plurality of threshold values (an upper limit value and a lower limit value of a predetermined range) into the predetermined range and a range outside the predetermined range, and a map in which a discount rate is set for each classification is stored in storage 104. Management server 100 refers to the map to set a different discount rate A(6) depending on whether the SOC falls within the predetermined range. The predetermined range is set in view of whether how the battery's degradation proceeds varies when the battery is neither charged nor discharged.

For example, when an SOC during a non-traveling period of time falls within the predetermined range, management server 100 sets a discount rate A(6) of 2%. When an SOC during a non-traveling period of time does not fall within the predetermined range, management server 100 sets a discount rate A(6) of 0%.

Returning to FIG. 3, in S118, management server 100 applies a total sum of the calculated discount rates A(1) to A(6) to multiply a basic fee per unit time to calculate a discounted amount, and subtracts the discounted amount from the basic fee to set a rental fee. The basic fee per unit time is a predetermined fee. Management server 100 may perform a billing process to bill the set rental fee to the user. Alternatively, when a user selects automatic payment using information of a credit card or the like registered by the user in advance, management server 100 may perform a settlement process for settling the set rental fee. Alternatively, management server 100 may notify a mobile terminal owned by the user of the rental fee. In doing so, for example, management server 100 may notify the user's mobile terminal of the details of the discount rates A(1) to A(6).

<Operation of Management Server 100 Serving as Rental Fee Setting Apparatus>

An operation of management server 100 which is a rental fee setting apparatus based on the above configuration and flowchart will now be described. For example, it is assumed that vehicle 200 has been rented to a user.

When vehicle 200 is returned (YES in S100), management server 100 transmits a request to vehicle 200 to transmit a usage history of vehicle 200 and obtains the usage history from vehicle 200 (S102). From a non-traveling period of time included in the obtained usage history and a period of time for which the vehicle is utilized as calculated from a renting date and time and a return date and time, management server 100 calculates a ratio of the non-traveling period of time to the period of time for which the vehicle is utilized (S104).

Management server 100 sets a discount rate A(1) based on the calculated ratio of the non-traveling period of time (S106), a discount rate A(2) based on how many times the vehicle is rapidly accelerated as indicated in the usage history (S108), and a discount rate A(3) based on how many times the vehicle is rapidly decelerated as indicated in the usage history (S110). Then, management server 100 sets a discount rate A(4) based on the environmental temperature (S112), a discount rate A(5) based on the parking environment (S114), and a discount rate A(6) based on the SOC (S116). Management server 100 applies a total sum of the discount rates A(1) to A(6) to multiply a basic fee to calculate a discounted amount and subtracts the discounted amount from the basic fee to set a rental fee corresponding to the period of time for which the vehicle is utilized (S118).

<Function and Effect of Rental Fee Setting Apparatus>

As described above, the rental fee setting apparatus according to the present embodiment will set a rental fee depending on an amount by which an electric vehicle is not utilized (specifically, a rental fee of an amount smaller by an amount by which the vehicle is not utilized), and the rental fee setting apparatus can thus set a rental fee which gives sufficient satisfaction to a user. Thus there can be provided a rental fee setting apparatus, method and system that sets a rental fee for an electric vehicle to be rented to a user so that the user is sufficiently satisfied with the set rental fee.

Furthermore, a rental fee of a smaller amount is set when a vehicle while utilized is rapidly accelerated/decelerated a smaller number of times than when the vehicle while utilized is rapidly accelerated/decelerated a larger number of times. In this way, when a vehicle is driven with a battery gradually degraded, a rental fee of a smaller amount is set, and a rental fee giving sufficient satisfaction to a user can thus be set.

Further, a rental fee of a smaller amount is set for a lower environmental temperature during a non-traveling period of time than a higher environmental temperature during a non-traveling period of time. In this way, for a non-traveling period of time when a vehicle is stopped with a battery gradually degraded, a rental fee of a smaller amount is set, and a rental fee giving sufficient satisfaction to a user can thus be set.

Further, a rental fee of a smaller amount is set when a parking environment during a non-traveling period of time is an indoor environment than when it is an outdoor environment. In this way, for a non-traveling period of time when a vehicle is stopped with a battery gradually degraded, a rental fee of a smaller amount is set, and a rental fee giving sufficient satisfaction to a user can thus be set.

Further, a rental fee of a smaller amount is set when an SOC during a non-traveling period of time falls within a predetermined range than when it does not. In this way, for a non-traveling period of time when a vehicle is stopped with a battery gradually degraded, a rental fee of a smaller amount is set, and a rental fee giving sufficient satisfaction to a user can thus be set.

<Modifications>

While in the above embodiment, setting a discount rate applied to a fee per unit time in renting vehicle 200 that is an electric vehicle has been described as an example, the above described discount rates may be applied in setting a monthly fee for a manner of utilization in which vehicle 200 is leased until a prescribed period of time elapses, or in setting a fee corresponding to a period of time for which a vehicle is utilized for a manner of utilization in which one or more vehicles are shared by a plurality of users. Alternatively, the above described discount rates may be applied in setting a monthly fee for a manner of utilization in which, rather than an electric vehicle, battery 214 is alone leased for a prescribed period of time.

While the above embodiment has been described with a discount rate set to be applied to a basic fee, setting a discount rate is not exclusive insofar as a fee is substantially discounted. For example, instead of a discount rate, a returning rate associated with a monthly fee may be set and applied to provide a rebate by cash, a voucher or a variety of types of points.

Furthermore, while the above embodiment has been described such that in addition to the discount rate A(1) the discount rates A(2) to A(6) are set, for example the discount rate A(1) may alone be set or in addition to the discount rate A(1) at least one of the discount rates A(2) to A(6) may be set.

While the above embodiment has been described with a discount rate set to be applied to a basic fee, a partial basic fee corresponding to each of the discount rates A(1) to A(6) may be set and a total sum thereof may be set as a rental fee, or an extra rate applied to a basic fee may be set and an extra amount may thus be added to the basic fee to set a rental fee, or a discounted item and an extra item may be classified and for the discounted item a discount rate may be set whereas for the extra item an extra rate may be set to thus set a discounted amount and an extra amount, and the discounted amount may be subtracted from the basic fee and the extra amount may be added to the basic fee to thus set a rental fee.

Further, while in the above embodiment how many times a vehicular requested power exceeds an acceleration power line is counted as how many times a vehicle is rapidly accelerated, for example how many times vehicle 200 has actual power exceeding the acceleration power line may be counted as how many times the vehicle is rapidly accelerated. Alternatively, how many times a vehicular requested power or vehicle 200's actual power exceeds the acceleration power line continuously for a prescribed period of time may be counted as how many times the vehicle is rapidly accelerated. Alternatively, how many times vehicle 200 has an acceleration rate increased to be higher than a threshold value may be counted as how many times the vehicle is rapidly accelerated. Alternatively, how many times vehicle 200 has an acceleration rate exceeding the threshold value continuously for a prescribed period of time may be counted as how many times the vehicle is rapidly accelerated.

Further, while in the above embodiment how many times a vehicular requested power exceeds a deceleration power line is counted as how many times a vehicle is rapidly decelerated, for example how many times vehicle 200 has actual power exceeding the deceleration power line may be counted as how many times the vehicle is rapidly decelerated. Alternatively, how many times a vehicular requested power or vehicle 200's actual power exceeds the deceleration power line continuously for a prescribed period of time may be counted as how many times the vehicle is rapidly decelerated. Alternatively, how many times vehicle 200 has a deceleration rate increased to be higher than a threshold value may be counted as how many times the vehicle is rapidly decelerated. Alternatively, how many times vehicle 200 has a deceleration rate exceeding the threshold value continuously for a prescribed period of time may be counted as how many times the vehicle is rapidly decelerated.

Furthermore, while in the above embodiment whether a parking environment is an indoor environment or an outdoor environment is determined based on the positional information of vehicle 200, it may be determined for example via a sunshine sensor, an illuminance sensor, or the like provided on a roof, a glassy portion, or the like of vehicle 200. For example, it may be determined that a parking environment is an indoor environment when a sensor senses during a non-traveling period of time a quantity of light smaller than a threshold value, whereas it may be determined that a parking environment is an outdoor environment when the sensor senses during a non-traveling period of time a quantity of light larger than the threshold value. Alternatively, for example, it may be determined by using a solar panel provided on the roof of vehicle 200. For example, it may be determined that a parking environment is an indoor environment when the solar panel generates an amount of power smaller than a threshold value during a non-traveling period of time, whereas it may be determined that a parking environment is an outdoor environment when the solar panel generates an amount of power larger than the threshold value during a non-traveling period of time.

It should be noted that the above modifications may be implemented all together or may partially be implemented in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rental fee setting apparatus configured to set a rental fee for an electric vehicle, the electric vehicle comprising a power storage device, an electronic control unit for executing programs stored in memory and based on information stored in storage, an accelerator pedal position sensor, a light sensor mounted on the electric vehicle, and an external air temperature sensor mounted therein, the rental fee setting apparatus comprising:

a central processing unit (CPU) for executing prescribed computation processing on information stored in memory on a storage device and information received from the electric vehicle via a communication device;

the communication device configured to wirelessly communicate with a second communication device of the electric vehicle through a wireless base station; and a timer for counting a current date and time in the storage device, the CPU, the communication device, the storage device, and the timer being communicatively connected by a communication bus, the storage device configured to store a utilization history of the electric vehicle while rented; and the CPU including a setting device, the setting device is further configured to set a rental fee depending on a ratio of a non-traveling period of time of the electric vehicle to a utilizing period of time of the electric vehicle, the non-traveling period of time including a period of time of the utilizing period of time, for which the electric vehicle is stopped and the power storage device is neither charged nor discharged, the setting device is further configured to wirelessly obtain a history of an external temperature of the electric vehicle, measured by the external air temperature sensor and stored in the storage of the electronic control unit, for the utilizing period of time, obtain a sensed accelerator pedal position from the accelerator pedal position sensor, for the utilizing period of time, and, obtain a sensed light quantity to determine if the electric vehicle was parked indoors or outdoors with the light sensor based on a sensed light quantity threshold, for the non-traveling period of time, obtain a history of a state of charge of the power storage device from the electric vehicle for the utilizing period of time, and based on the obtained history of the external temperature when an environmental temperature during the non-traveling period of time is a lower environmental temperature, the setting device is further configured to set a lower rental fee than when the environmental temperature is a higher environmental temperature, wherein the setting device is configured to obtain a history of a traveling power of the electric vehicle for the utilizing period of time by counting how many times a vehicular requested power based on a requested driving force based on an accelerator pedal position and a vehicular speed exceeds an acceleration power line as the accelerator pedal is depressed, and based on the obtained history of the traveling power when the electric vehicle is rapidly accelerated a smaller number of times, the setting device is configured to set a lower rental fee than when the electric vehicle is rapidly accelerated a larger number of times, and based on the obtained history of light quantity sensed when the electric vehicle, during the non-traveling period of time, is parked indoors, the setting device is configured to set a lower rental fee than when the electric vehicle during the non-traveling period of time is parked outdoors.

2. The rental fee setting apparatus according to claim 1, wherein the setting device is configured to set a lower rental fee when the non-traveling period of time has a larger ratio than when the non-traveling period of time has a smaller ratio.

3. The rental fee setting apparatus according to claim 1, wherein based on the obtained history of the traveling power when the electric vehicle is rapidly decelerated a smaller number of times, the setting device is configured to set a lower rental fee than when the electric vehicle is rapidly decelerated a larger number of times.

4. The rental fee setting apparatus according to claim 1, wherein the setting device is configured to obtain a history of positional information of the electric vehicle for the utilizing period of time, and based on the obtained history of the positional information when the electric vehicle during the non-traveling period of time is parked indoors, the setting device is configured to set a lower rental fee than when the electric vehicle during the non-traveling period of time is parked outdoors.

5. The rental fee setting apparatus according to claim 1, wherein the setting device is configured to obtain a history of a state of charge of the power storage device from the electric vehicle for the utilizing period of time, and based on the obtained history of the state of charge when a state of charge for the non-traveling period of time falls within a predetermined range, the setting device is configured to set a lower rental fee than when the state of charge for the non-traveling period of time does not fall within the predetermined range.

6. A method for setting a rental fee for an electric vehicle including a power storage device, an electronic control unit for executing programs stored in memory and based on information stored in storage, an accelerator pedal position sensor, a light sensor mounted on the electric vehicle, and an external air temperature sensor, mounted therein, the method comprising:

providing a server including a central processing unit (CPU) for executing prescribed computation processing on information stored in memory on a storage device and information received from the electric vehicle via a communication device, the communication device configured to wirelessly communicate with a second communication device of the electric vehicle through a wireless base station, and a timer for counting a current date and time in the storage device, the CPU, the communication device, the storage device, and the timer being communicatively connected by a communication bus, storing a utilization history of the electric vehicle while rented in the storage device; and setting a rental fee depending on a ratio of a non-traveling period of time of the electric vehicle to a utilizing period of time of the electric vehicle with the CPU, the non-traveling period of time including a period of time of the utilizing period of time, for which the electric vehicle is stopped and the power storage device is neither charged nor discharged, the method further comprising:

wirelessly obtaining a history of an external temperature of the electric vehicle measured by the external air temperature sensor and stored in the storage of the electronic control unit, for the utilizing period of time with the CPU, obtaining a sensed accelerator pedal position from the accelerator pedal position sensor, for the utilizing period of time, and, obtaining a sensed light quantity to determine if the electric vehicle was parked indoors or outdoors with the light sensor based on a sensed light quantity threshold, for the non-traveling period of time, obtaining a history of a state of charge of the power storage device from the electric vehicle for the utilizing period of time, and based on the obtained history of the external temperature, when an environmental temperature during the non-traveling period of time is a lower environmental temperature, setting a lower rental fee than when the environmental temperature is a higher environmental temperature, obtaining a history of a traveling power of the electric vehicle for the utilizing period of time by counting how many times a vehicular requested power based on a requested driving force based on an accelerator pedal position and a vehicular speed exceeds an acceleration power line as the accelerator pedal is depressed with the CPU, and based on the obtained history of the traveling power when the electric vehicle is rapidly accelerated a smaller number of times, setting a lower rental fee than when the electric vehicle is rapidly accelerated a larger number of times with the CPU, and based on the obtained history of light quantity sensed when the electric vehicle, during the non-traveling period of time, is parked indoors, setting a lower rental fee than when the electric vehicle during the non-traveling period of time is parked outdoors with the CPU.

7. A rental fee setting system comprising:

an electric vehicle including a power storage device, an electronic control unit for executing programs stored in memory and based on information stored in storage, an accelerator pedal position sensor, a light sensor mounted on the electric vehicle, and an external air temperature sensor, mounted therein; and a server configured to set a rental fee for the electric vehicle, the server including a central processing unit (CPU) for executing prescribed computation processing on information stored in memory on a storage device, the communication device configured to wirelessly communicate with a second communication device of the electric vehicle through a wireless base station, and a timer for counting a current date and time in the storage device, the CPU, the communication device, the storage device, and the timer being communicatively connected by a communication bus, the server being configured to:

store a utilization history of the electric vehicle while rented; and set a rental fee depending on a ratio of a non-traveling period of time of the electric vehicle to a utilizing period of time of the electric vehicle, the non-traveling period of time including a period of time of the utilizing period of time, for which the electric vehicle is stopped and the power storage device is neither charged nor discharged, the server further configured to:

wirelessly obtaining a history of an external temperature of the electric vehicle, measured by the external air temperature sensor and stored in the storage of the electronic control unit, for the utilizing period of time, obtain a sensed accelerator pedal position from the accelerator pedal position sensor, for the utilizing period of time, and, obtain a sensed light quantity to determine if the electric vehicle was parked indoors or outdoors with the light sensor based on a sensed light quantity threshold, for the non-traveling period of time, obtain a history of a state of charge of the power storage device from the electric vehicle for the utilizing period of time, and based on the obtained history of the external temperature, when an environmental temperature during the non-traveling period of time is a lower environmental temperature, set a lower rental fee than when the environmental temperature is a higher environmental temperature, wherein the server is configured to obtain a history of a traveling power of the electric vehicle for the utilizing period of time by counting how many times a vehicular requested power based on a requested driving force based on an accelerator pedal position and a vehicular speed exceeds an acceleration power line as the accelerator pedal is depressed, and based on the obtained history of the traveling power when the electric vehicle is rapidly accelerated a smaller number of times, the server is configured to set a lower rental fee than when the electric vehicle is rapidly accelerated a larger number of times, and based on the obtained history of light quantity sensed when the electric vehicle, during the non-traveling period of time, is parked indoors, the server is configured to set a lower rental fee than when the electric vehicle during the non-traveling period of time is parked outdoors.

\* \* \* \* \*